United States Patent
Boettiger

(10) Patent No.: US 9,951,540 B2
(45) Date of Patent: Apr. 24, 2018

(54) VEHICLE HITCH SUPPORTED TRANSPORTABLE SHELTER

(71) Applicant: Richard W Boettiger, Magnolia, TX (US)

(72) Inventor: Richard W Boettiger, Magnolia, TX (US)

(*) Notice: Subject to any disclaimer, the term of this patent is extended or adjusted under 35 U.S.C. 154(b) by 0 days.

(21) Appl. No.: 15/599,995

(22) Filed: May 19, 2017

(65) Prior Publication Data

US 2018/0087288 A1 Mar. 29, 2018

Related U.S. Application Data

(60) Provisional application No. 62/495,892, filed on Sep. 29, 2016.

(51) Int. Cl.
| | |
|---|---|
| *E04H 15/06* | (2006.01) |
| *B60P 3/36* | (2006.01) |
| *B60P 3/34* | (2006.01) |
| *B60R 9/06* | (2006.01) |
| *B60P 3/38* | (2006.01) |

(52) U.S. Cl.
CPC ............... *E04H 15/06* (2013.01); *B60P 3/34* (2013.01); *B60P 3/36* (2013.01); *B60P 3/38* (2013.01); *B60R 9/06* (2013.01)

(58) Field of Classification Search
CPC ...... B60P 3/34; B60P 3/36; B60P 3/38; B60R 9/06; E04H 15/06
See application file for complete search history.

(56) References Cited

U.S. PATENT DOCUMENTS

| | | | | |
|---|---|---|---|---|
| 2,604,671 A | * | 7/1952 | Sherman ................ | B60P 3/341 296/165 |
| 3,359,693 A | * | 12/1967 | Mitas ..................... | B60P 3/34 296/165 |
| 3,801,128 A | * | 4/1974 | Herndon ................ | B60P 3/36 280/763.1 |
| 4,027,912 A | * | 6/1977 | Pacca .................... | B60P 3/38 296/160 |
| 4,858,986 A | * | 8/1989 | Whitley ................. | B60P 3/34 296/161 |
| 4,960,299 A | * | 10/1990 | Steadman .............. | B60P 3/34 296/172 |
| 4,971,509 A | * | 11/1990 | Sechovec .............. | A61G 3/0209 224/507 |
| 5,066,065 A | * | 11/1991 | Baughman ............. | B60P 3/38 135/88.13 |
| 5,690,260 A | * | 11/1997 | Aikins ................... | B60R 9/06 224/504 |

(Continued)

*Primary Examiner* — D Glenn Dayoan
*Assistant Examiner* — Paul Chenevert
(74) *Attorney, Agent, or Firm* — Norton Rose Fulbright US LP

(57) ABSTRACT

Systems and methods herein provide a transportable shelter that is retractable while not in use (e.g., traveling, storage, and the like), is fully supported by a vehicle while being hauled without the use of tow wheels, and can be supported and transported by any automobile regardless of its make and/or model. Further, the transportable shelter is expandable while in use (e.g., housing a person therein) and provides shelter from external environmental elements (e.g., rain, wind, temperatures, sun, strangers, bugs, animals, pests, and the like).

27 Claims, 7 Drawing Sheets

(56) References Cited

U.S. PATENT DOCUMENTS

| | | | | |
|---|---|---|---|---|
| 6,062,451 A * | 5/2000 | Lassanske | | B60R 9/06 |
| | | | | 224/502 |
| 6,129,371 A * | 10/2000 | Powell | | B60R 9/06 |
| | | | | 224/502 |
| 6,179,368 B1 * | 1/2001 | Karlsson | | B60P 3/341 |
| | | | | 135/88.13 |
| 6,485,243 B1 * | 11/2002 | Ferman | | B60R 9/06 |
| | | | | 224/520 |
| 6,644,525 B1 * | 11/2003 | Allen | | B60R 9/06 |
| | | | | 224/282 |
| 6,871,896 B1 * | 3/2005 | Owen | | B60P 3/341 |
| | | | | 135/88.05 |
| 6,971,707 B1 * | 12/2005 | Mullan | | B60P 3/39 |
| | | | | 296/159 |
| 8,061,571 B2 * | 11/2011 | Aghajanian | | B60R 9/06 |
| | | | | 224/499 |
| 8,235,268 B2 * | 8/2012 | Sautter | | B60R 9/06 |
| | | | | 224/495 |
| 8,678,472 B2 * | 3/2014 | Pierce | | B60P 3/39 |
| | | | | 296/159 |
| 9,179,759 B1 * | 11/2015 | Turner | | A45F 3/22 |
| 9,394,718 B1 * | 7/2016 | Hill | | E04H 15/001 |
| 9,663,039 B2 * | 5/2017 | Marmon | | B60D 1/58 |
| 9,694,758 B1 * | 7/2017 | Krolski | | B60P 1/28 |
| 2009/0179455 A1 * | 7/2009 | Ogden | | E04H 15/06 |
| | | | | 296/161 |
| 2011/0057008 A1 * | 3/2011 | Clausen | | B60R 9/06 |
| | | | | 224/504 |
| 2013/0093208 A1 * | 4/2013 | Peck | | B60P 3/341 |
| | | | | 296/165 |
| 2015/0321716 A1 * | 11/2015 | Patterson | | B60D 1/58 |
| | | | | 296/26.09 |
| 2017/0197538 A1 * | 7/2017 | Patterson | | B60P 3/34 |
| 2017/0240088 A1 * | 8/2017 | Tait | | B60P 3/34 |
| 2017/0240089 A1 * | 8/2017 | Tait | | B60P 3/34 |

* cited by examiner

VEHICLE HITCH SUPPORTED TRANSPORTABLE SHELTER

CROSS-REFERENCE TO RELATED APPLICATIONS

This application claims the benefit of U.S. Provisional Patent Application No. 62/495,892, entitled "VEHICLE HITCH SUPPORTED EXTENDABED", filed on Sep. 29, 2016.

TECHNICAL FIELD

Aspects of the present disclosure relate generally to camping gear, and more particularly, to a telescoping transportable shelter that is hauled behind a vehicle without towing wheels.

INTRODUCTION

Outdoor enthusiasts often travel with sleep quarters, so the enthusiasts are not restricted to sleeping at locations having hotel or motel facilities. For example, hunters, fishermen, hikers, showmen (e.g., horse showmen, dog showmen, stockyard participants, and the like) often travel with recreational vehicles (RVs), which provide secure, climate controlled environments for sleeping. RVs provide convenience in that the sleeping quarters may be located near an event of interest. For example, an RV may be parked in the parking lot of a stockyard show or near a fisherman's stream. Further, with extended use, RVs may save the user money as compared to paying nightly rates at a hotel.

That being said, traditional RVs are cumbersome and difficult to transport. Traditional trailer hitch RVs comprise two or more wheels and are hauled behind a vehicle (e.g., truck, sport utility vehicle (SUV), car, and the like). Most traditional trailer RVs are rather large and their size is generally fixed. The size of a traditional trailer RV causes the user to expend significant amounts of gasoline while traveling and requires a great amount of storage space when not in use. The industry has tried to solve this size problem by offering popup trailers. Popup trailers often have two positions: use and nonuse. While in use, the popup trainer is in its expanded state, and the interior provides sleeping space within which a user can maneuver and sleep. While in non-use (e.g., while in storage or traveling), the popup trailer is in its collapsed state, wherein portions of the popup trailer fold or retract into the interior space, thereby compacting the size of the popup trailer.

Popup trailers improve fuel efficiency and reduce storage space needs as compared to traditional RVs; however, popup trailers require two or more two wheels (i.e., road appropriate wheels such as vehicle wheels and tires) for support and transportation, thereby making it a wheel hauled trailer. Wheel hauled trailers are difficult to maneuver on the road, react counterintuitively when traveling in reverse, and are challenging to park. Further, wheel hauled trailers usually require state registration, license tags, and insurance independent of the vehicle hauling the wheel hauled trailer, which takes time to acquire and is costly.

The industry again attempted to solve the problems popup trailers cause by offering truck bed tents and/or truck bed campers. A truck bed tent/camper may be a sleeping space that fits within the bed of a truck (e.g., pickup truck). The truck bed tent/camper may be collapsible (e.g., similar to a popup trailer) or may be of fixed size (e.g., similar to a fix size RV). Truck bed tents/campers fit within and are supported by the bed of the truck. As such, truck bed tents/campers are not wheel hauled trailers. The truck bed tent/camper's location makes it easier to maneuver and avoids the costs associated with vehicle registration and licenses. However, the truck bed tent/camper consumes the truck's bed, which is traditionally used for storage. For example, if a fisherman filled his/her truck bed with a truck bed tent/camper, the fisherman would have limited place to store his/her fishing tackle during transit because the bed of the truck is no longer an option. Further, truck bed tent/campers can only be used with an open bed truck. Users who drive cars, SUVs, or closed bed trucks (e.g., a truck with a bed lid) are unable to accommodate a truck bed tent/camper.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Thus, it would be desirable to have a transportable shelter that is retractable while not in use (e.g., traveling, storage, and the like), does not utilize tow wheels while being hauled behind a vehicle, and can be supported and transported by any automobile regardless of its make and/or model. Further, it would be desirable if the transportable shelter is expandable while in use (e.g., housing a person therein) and provides shelter from external environmental elements (e.g., rain, wind, temperatures, sun, strangers, bugs, animals, pests, and the like).

In one aspect of the disclosure, a transportable shelter is provided. For example, the shelter may provide shelter from exterior elements. Example transportable shelters may include a telescoping housing comprising a plurality of segments, wherein while in an expanded position, the telescoping housing accommodates at least one person therein. Embodiments include a first segment of the plurality of segments and a second segment of the plurality of segments, wherein while in a retracted position, the second segment slides into the first segment. A transportable shelter may also include an insert bar that is receivable into a trailer hitch receiver of a vehicle, wherein while in the retracted position, the transportable shelter is hauled without towing wheels by the vehicle.

In embodiments, the first segment comprises a driver's-side side section, a passenger's-side side section, a roof section, and a front section, and if desired, a window or vent that transitions between an open position and a closed position is included within the at least one of: the driver's-side section, the passenger's-side side section, the roof section, and the front section. In embodiments, the first segment comprises a retractable floor inside the interior of the first segment. In exemplary transportable shelters, while the transportable shelter is in the expanded position, the retractable floor expands into the inside of the interior of the second segment, and while the transportable shelter is in the retracted position, the retractable floor retracts into the first segment. Further, in embodiments, the first segment comprises a storage shelf inside the interior of the first segment, and if desired, an air conditioner is stored on the storage shelf.

In another aspect of embodiments of a transportable shelter, the first segment comprises at least one support leg that transitions between a retracted position and an expanded position. When the first segment comprises a plurality of support legs, the plurality of support legs may transition into the expended position independent from each other. Further, in examples, at least one of the at least one support leg comprises caster wheels that transport the transportable shelter while not coupled to the vehicle.

In embodiments, the second segment comprises a driver's-side side section, a passenger's-side side section, a roof section, and a back section, and if desired, a window or vent that transitions between an open position and a closed position is included within the at least one of the driver's-side section, the passenger's-side side section, the roof section, and the back section. In examples, the second segment comprises a door through which the person may enter.

In another aspect of embodiments of a transportable shelter, the second segment comprises at least one support leg that transitions between a retracted position and an expanded position. When the second segment comprises a plurality of support legs, the plurality of support legs may transition into the expended position independent from each other. In further examples, at least one of the at least one support leg comprises caster wheels that transport the transportable shelter while not coupled to the vehicle.

In another aspect of embodiments, a transportable shelter may comprise a third segment of the plurality of segments, wherein while in the expanded position, the third segment is between the first segment and the second segment, and wherein while in the retracted position, the second segment slides into the third segment and the third segment slides into the first segment. In embodiments, the third segment may comprises a driver's-side side section, a passenger's-side side section, a roof section, and if desired, a window or vent that transitions between an open position and a closed position is included within the at least one of the driver's-side section, the passenger's-side side section, and the roof section.

In another aspect of embodiments of a transportable shelter, the third segment may comprises at least one support leg that transitions between a retracted position and an expanded position. When the second segment comprises a plurality of support legs, the plurality of support legs may transition into the expended position independent from each other. In embodiments, at least one of the at least one support leg comprises caster wheels that transport the transportable shelter while not coupled to the vehicle.

In embodiments, a transportable shelter may comprise a seal between the first segment and the second segment. In embodiments, the transportable shelter may include a seal between the first segment and the third segment and another seal between the second segment and the third segment.

In embodiments, while the transportable shelter is in the retracted position, the telescoping housing is storable within twelve square feet.

In an aspect of the disclosure, a method is provided. For example, a method may expand a transportable shelter, which provides shelter to a person from exterior elements. In embodiments, a method may provide a telescoping housing comprising a plurality of segments including at least a first segment and a second segment. Example methods may expand the second segment out from the first segment and lower one or more support legs down from at least one of the first segment and the second segment. Example methods may decouple an insert bar of the transportable shelter from a trailer hitch receiver of a vehicle. Further, in example methods, at least one person may enter the transportable shelter through a door of the second segment. Further still, example methods may expand a third segment out from the first segment and expand the second segment out from the third segment. In embodiments, one or more of the support legs comprise caster wheels and the transportable shelter is pushed by a person via the caster wheels.

In an aspect of the disclosure, a method is provided. For example, a method may prepare a transportable shelter, which provides shelter to a person from exterior elements, to be hauled. An example method may provide a telescoping housing comprising a plurality of segments including at least a first segment and a second segment and retract the second segment into the first segment. Further, an example method may raise one or more support legs up into at least one of the first segment and the second segment and couple an insert bar of the transportable shelter into a trailer hitch receiver of a vehicle, wherein while in the retracted position, the transportable shelter is fully supported by the vehicle. In embodiments, a method may retract a third segment out from the first segment and retract the second segment out from the third segment.

Other aspects, features, and embodiments of the present invention will become more apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

It would be desirable to have a transportable shelter that is retractable while not in use (e.g., traveling, storage, and the like), does not utilize tow wheels while being hauled behind a vehicle, and can be supported and transported by any automobile regardless of its make and/or model. Transportable shelter 100 may provide a secure, climate controlled environment that offers protection from outdoor elements by enclosing one or more user (e.g., person) and their property while in the expanded position. For example, transportable shelter 100 may be used as sleeping quarters. Further, transportable shelter 100 may provide a retracted, compact, self-containing unit, which is hauled by a vehicle without the use of tow wheels and storable in small storage space as compared to traditional vehicle hauled sleep quarters.

Figure 1A:
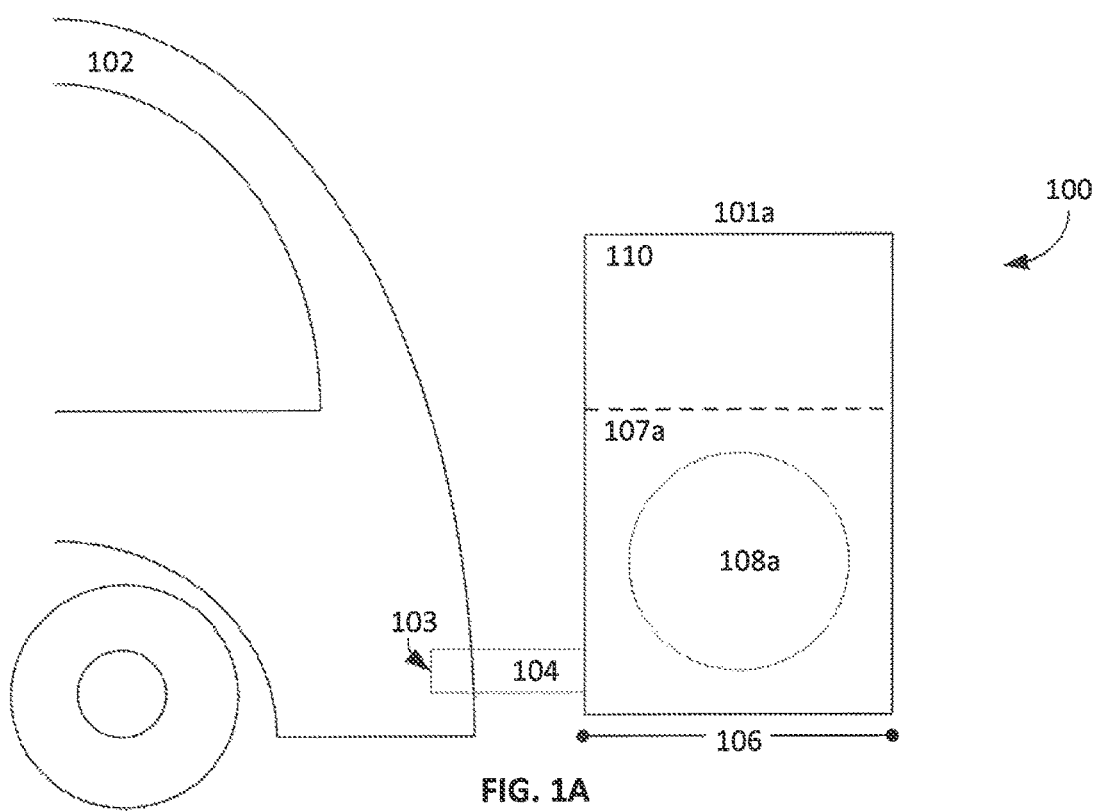
FIG. 1A is a block diagram illustrating details of a transportable shelter according to some embodiments.

FIG. 1A illustrates an example embodiment of a transportable shelter 100. In FIG. 1A, vehicle 102 supports transportable shelter 100. Vehicle 102 may be a car, SUV, van, truck, and/or the like. Vehicle 102 may be equipped with a trailer hitch receiver 103. Trailer hitch receiver 103 may be equipped to receive an insert (e.g., a trail hitch insert that slides into trailer hitch receive 103). In embodiments, vehicle 102 may be equipped with trailer taillight wiring (not shown).

Figure 1B:
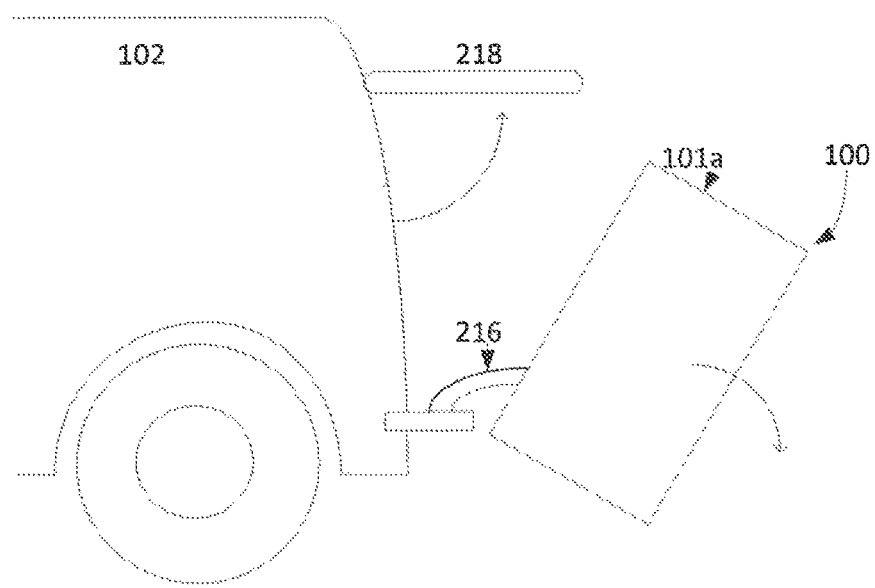
FIG. 1B is a block diagram illustrating details of a transportable shelter according to some embodiments.

Transportable shelter 100 may include insert 104. Transportable shelter 100 may connect to vehicle 102 via insert 104. An example insert is a bar and/or shank that slides into trailer hitch receiver 103. Insert 104 may be received into trailer hitch receiver 103 and fasten to trailer hitch receiver 103 via one or more pin, clip, screw, tongue, latch, lock, and/or other fastening/coupling mechanism. FIG. 1B illustrates an example insert 104 that includes a tilting hinge 216 and/or a swinging hinge (not shown). Tilting hinged 216 and/or swinging hinge allows transportable shelter 100 to tilt down, swing left, and/or swing right, thereby enabling user access to the trunk of vehicle 102 (e.g., via back glass 218).

Insert 104 may be rated to support a significant amount of weight (e.g., 100 lbs. to 5,000 lbs.). In embodiments, insert 104 is rated to support up to 500 lbs. Additionally or alternatively, transportable shelter 100 may connect to vehicle 102 via a ball mount and/or the like.

Transportable shelter 100 may include multiple segments that telescope into one another while in the retracted position. FIG. 1A shows an example retracted position of transportable shelter 100, wherein segment 101a can be seen from the outside. Additional segments (shown in subsequent figures) are telescoped into segment 101a.

Segment 101a may include front section (not shown) that faces vehicle 102, base section 106 that faces the ground, a side section 107a that faces the driver's side, a side section (not shown) that faces the passenger's side, and a roof portion 110 that faces the sky. In embodiments, roof portion 110 is curved, slanted, angled, sectioned, flat, and/or otherwise shaped to connect the driver's-side side panel 107a to the passenger's-side side panel (not shown). One or both side panels may include a window and/or vent 108. Further, roof portion 110 may include a window and/or vent. Some or all windows and/or vents of transportable shelter 100 may transition between a closed and an open position. Some or all windows and/or vents of transportable shelter 100 may include a screen. Some or all windows and/or vents of transportable shelter 100 may be of any shape and size and may be the same or different shapes and sizes as compared to each other.

Figure 2:
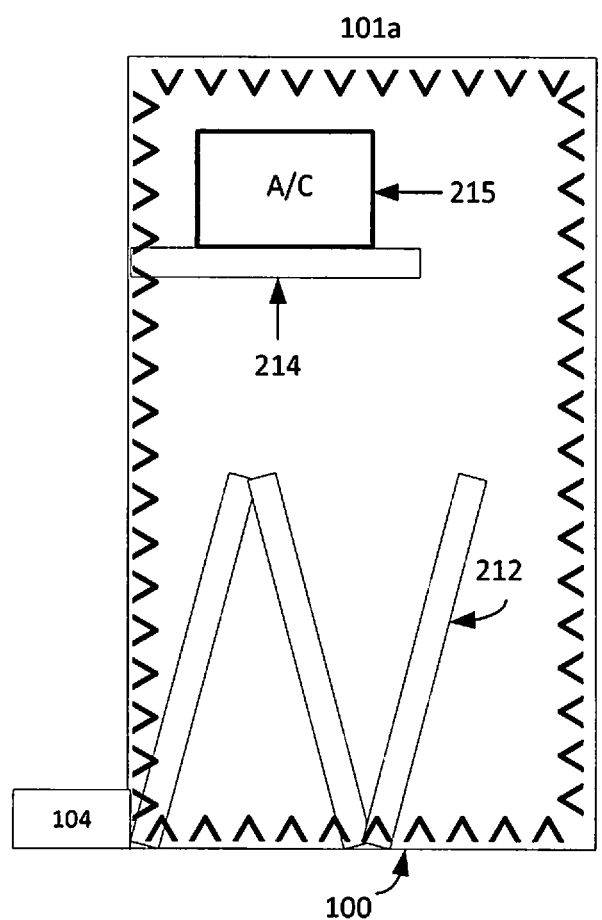
FIG. 2 is a block diagram illustrating details of a transportable shelter according to some embodiments.

FIG. 2 illustrates an example embodiment of an interior of transportable shelter 100. The interior of transportable shelter 100 may include a retractable floor 212. In the retracted position, retractable floor 212 may fold, for example like an accordion, at breaks and/or hinges of retractable floor 212. Additionally or alternatively, retractable floor 212 may telescope, rollup, and/or otherwise compact, as is desired. Retractable floor 212 may be removable, if desired, so retractable floor 212 may be cleaned with ease. The interior of transportable shelter 100 may include a storage shelf 214. Storage shelf 214 may attach to the interior portion of segment 101a for example at segment 101a's front section, one or more side section, and/or the roof. Storage shelf 214 may be removable if desired.

Figure 3:
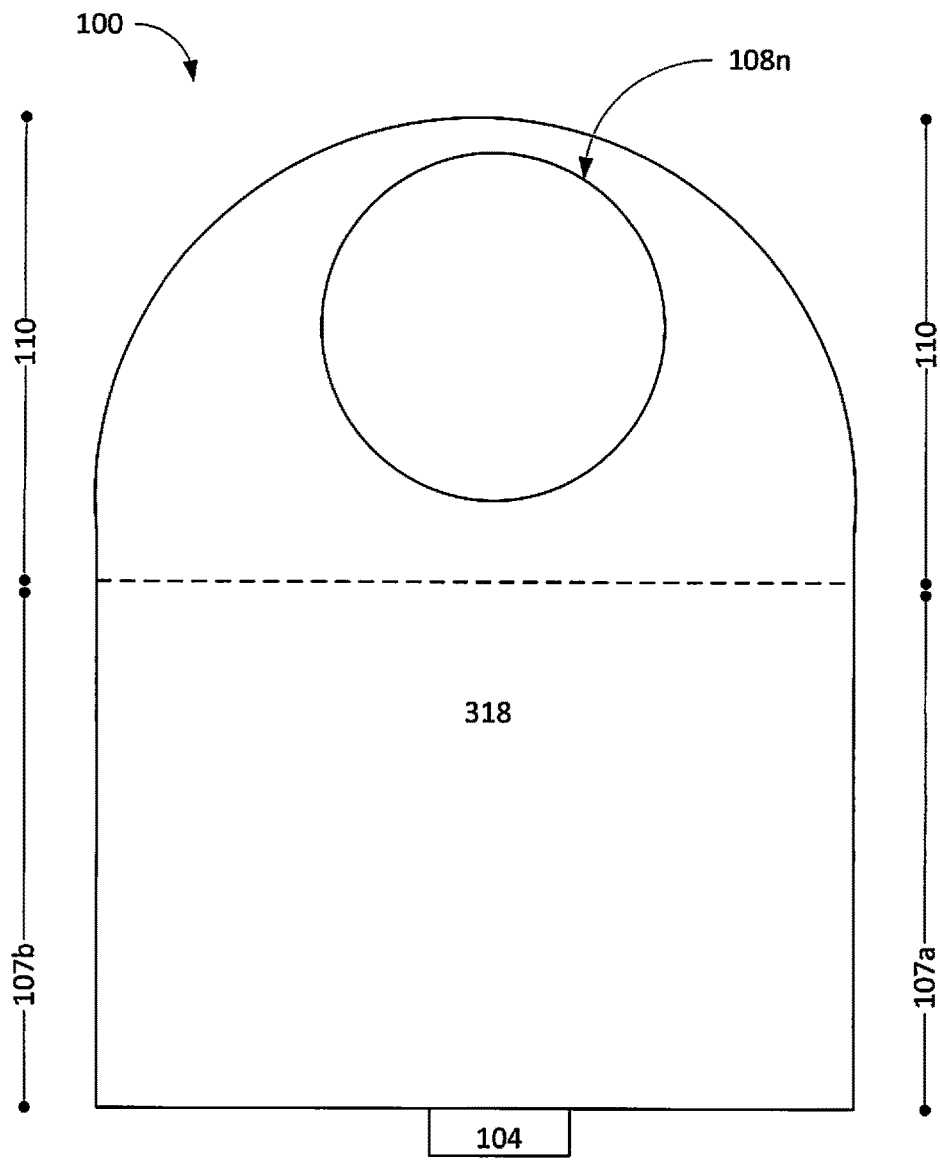
FIG. 3 is a block diagram illustrating details of a transportable shelter according to some embodiments.

FIG. 3 illustrates an example embodiment of a front view of transportable shelter 100. This perspective shows an example embodiment of roof section 110 connecting driver's-side side section 107a and passenger's-side side section 107b. An example of front section 318 of segment 101a is also illustrated. In this example, front section 318 includes a window and/or vent 108n. In embodiments, window and/or vent 108n may include a reversible fan 317. In embodiments, window and/or vent 108n may line up with storage shelf 214. If desired, an air conditioner may rest and/or be attached to storage shelf 214. The air conditioner 215 (shown in FIG. 2) may utilize window and/or vent 108n for air circulation. The air conditioner may heat and/or cool the interior of transportable shelter 100. The air conditioner may be removable, if desired. Further, the air conditioner may be stored within transportable shelter 100 while transportable shelter 100 is in the retracted position.

Figure 4A:
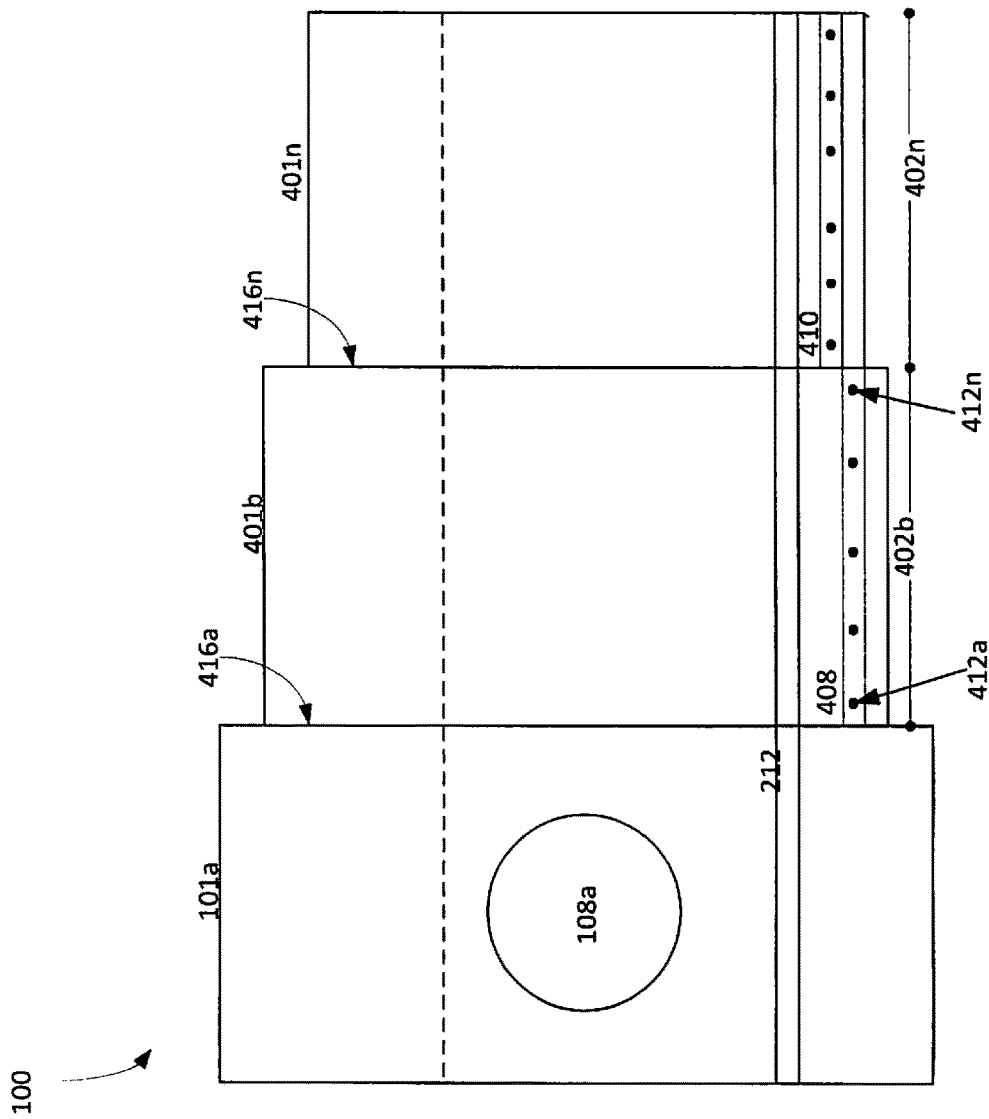
FIGS. 4A and 4B are block diagrams illustrating details of a transportable shelter according to some embodiments.
Figure 4B:
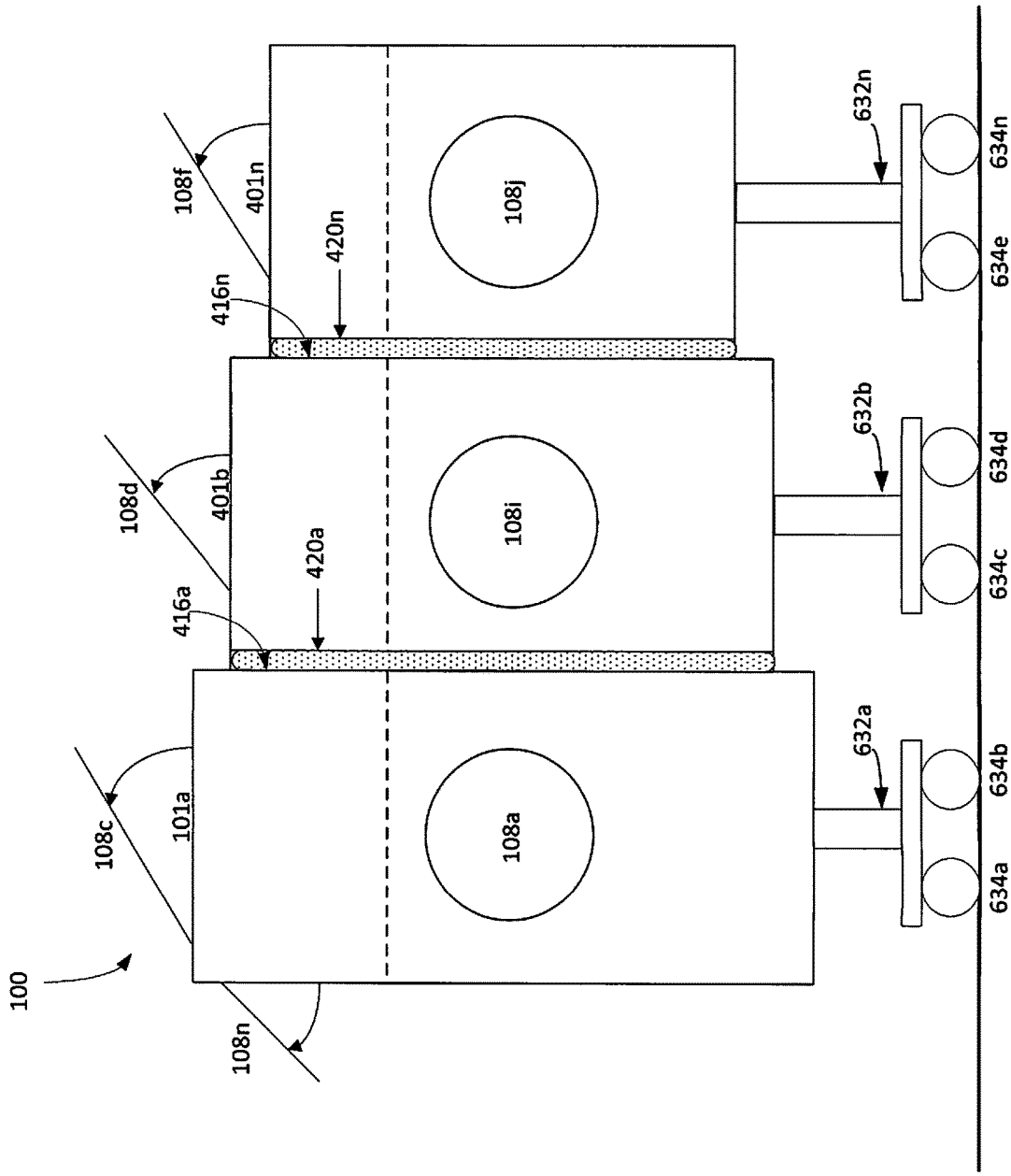

FIG. 4A illustrates an example embodiment of a driver's-side view of transportable shelter 100 in an example expanded position. FIG. 4B illustrates an example embodiment of a passenger's-side view of transportable shelter 100 in an example expanded position. Segment 401b may include a driver's-side side section, a passenger's-side side section, a roof section, and a base section 402b similar to that of segment 101a. Likewise, segment 401n may include a driver's-side side section, a passenger's-side side section, a roof section, and a base section 402n similar to that of segment 101a. If desired, any and/or all of the driver's-side side sections, a passenger's-side side sections, base sections, and/or a roof sections of segments 101a-401n may include a window and/or vent 108a-108n.

In example embodiments, one or more of the segments may be approximately 26 inches long (e.g., length of the driver's-side side section), approximately 48 inches tall (e.g., height of the driver's-side side section), and approximately 60 inches wide (e.g., the width of the base). In examples, one or more segments may be shaped progressively smaller as they telescope out of another segments. For example, in FIG. 4, segment 101a may be approximately 26 inches long, approximately 48 inches tall, and approximately 48 inches wide, while segment 401b is of a size that fits within segment 101a, and segment 401n is of a size that fits within segment 401b. Additionally or alternatively, one or more segments may be shaped progressively larger as they telescope out of another segments.

In this example, segments 401b-401n extend out from segment 101a. Any number of segments of any dimensions may extend from segment 101a, as is desired. The various segments may be of different lengths, widths, and heights as compared to each other. For example, as each respective segment extends away from segment 101a, the respective segments may be of progressively smaller (or larger) dimensions, such that the segments may telescope into one another. For instance, segment 401n may have smaller (or larger) dimensions than 401b, which may have smaller (or larger) dimensions than 101a, such that segment 401n telescopes into segment 401b, which telescopes into segment 101a.

Segment 401b may also include slides 408 that mate, pair, match, or otherwise couple to slides (not shown) of segment 101a. Slides 408 may include ball bearings 412a-412n. Segment 401b may include one or more slides 408. Slides 408 may assistant in telescoping segment 401b to and from segment 101a. Slides 408 may be located at one or more locations on the driver's-side of segment 401b, one or more locations on the passenger's-side of segment 401b, one or more locations on of the base segment 401b, and/or one or more locations on roof of segment 401b. Slides 408 may be of industrial strength, and if desired, may support a significant amount of weight (e.g., 200 lbs.). Segment 401n may also include slides 410 that mate, pair, match, or otherwise couple to slides (not shown) of segment 401b, as is described above.

In embodiments, a seal 420a may be provided at seam 416a between the driver's-side side section of segment 401b and the driver's-side side section 107a of segment 101a. The same or a different seal may be provided between the passenger's-side side section of segment 401b and the passenger's-side side section 107b of segment 101a. The same or a different seal may be provided between the roof section of segment 401b and the roof section 110 of segment 101a. The same or a different seal may be provided between the base 402a of segment 401b and the base 106 of segment 101a. The one or more seals may include a membrane, a substrate, a woven (e.g., waterproof, water resistance, water repellant, and/or the like), and/or the like, that connects and/or covers a portion and/or all of a seam 416a between segment 101a and segment 401b. Additionally and/or alternative, the one or more seals may include strips and/or a ring (not shown) located at seam 416a that seals some or all of seam 416a. The strips and/or ring may be made of silicon, rubber, plastic, a flexible membrane, and/or the like. The one or more seal may be attached to the inside and/or outside of segment 101a. Additionally and/or alternative, the one or more seal may be attached to the inside and/or outside of segment 401b. The one or more seal may aid in providing climate control (water control, moisture control, temperature control, air control, and the like) within transportable shelter 100. In embodiments, one or more seal 420n may be provided at seam 416n between segment 401b and segment 401n, as is described above. Segment 401n may further comprise a back section 418 (not shown), which is described in further detail below.

In the expanded position, a user may flatten retractable floor 212. Further, a user may enter the interior of transportable shelter 100. One or more user may use the interior environment of transportable shelter 100 for any reason including, but not limited to, sleeping, relaxing, escaping the elements, resting, reading, enjoying a controlled climate, storing property, and/or the like. If desired, transportable shelter 100 may accommodate one or more mattress (e.g., a queen sized mattress) on flattened retractable floor 212. In examples, transportable shelter 100 may include an air mattress that deflates, folds, and/or stores while not in use. If desired, a deflated air mattress may be stored within transportable shelter 100 while transportable shelter 100 is in its retracted position. While inside transportable shelter 100, one or more user may open one or more of the of windows and/or vents. Additionally or alternatively, while inside transportable shelter 100, one or more user may use the air conditioner and/or reversible fans.

Figure 5:
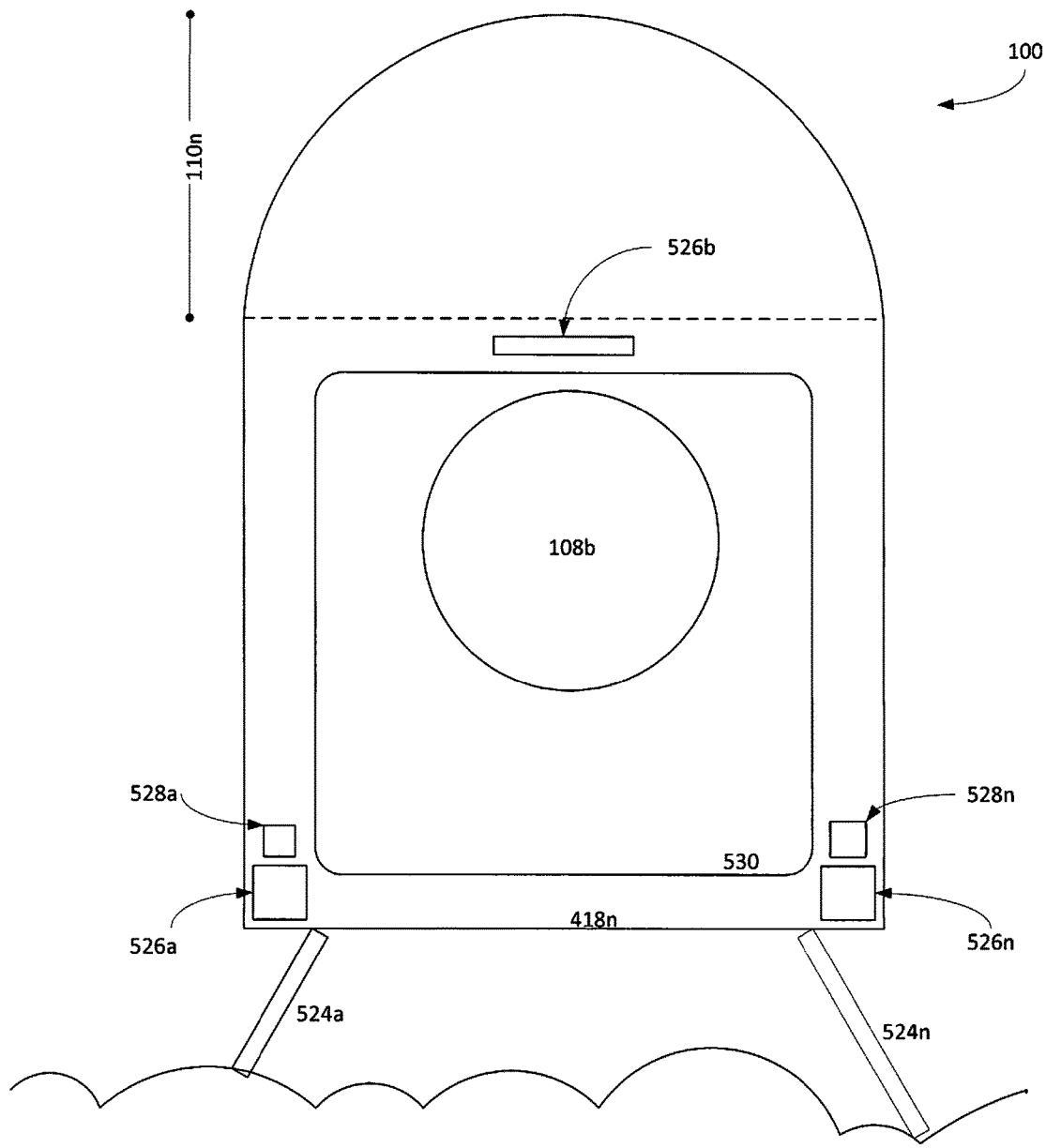
FIG. 5 is a block diagram illustrating details of a transportable shelter according to some embodiments.

FIG. 5 illustrates an example embodiment of a back view of transportable shelter 100. This perspective shows an example embodiment of roof section 110n connecting segment 401n's driver's-side side section and passenger's-side side section. An example of segment 401n's back section 418n is also illustrated. Back section 418n may include tail lights. The tail lights may include stop lights 526a-526n as well as directional lights 528a and 528b. In embodiments, stop light 526a and direction light 528a may be combined into a single unit, as well as stop light 526b and direction light 528b. Stop lights 526a-526n may indicate when vehicle 102 is stopping, and directional lights 528a and 528b may indicated the direction of vehicle 102 (e.g., right, left, backwards, and the like). The tail lights may receive power and control signals via trailer taillight wiring (not shown).

Back section 418n may include a door 530. In example, door 530 may be teardrop shaped and/or any other shape. Door 530 may open to the right and/or the left, if desired. In embodiments, door 530 may open upwards and provide cover for people and/or items located below. Further, in embodiments, door 530 may open downward and operate as a tail gate. In embodiments, door 530 may be removable, if desired. Door 530 may include a window and/or vent 108b. Door 530 may include a reversible fan.

Transportable shelter 100 may include retractable support legs 524a-524n. In examples, while transportable sleeping space is in transit, retractable support legs 524a-524n may be in a retracted position. Further, in examples, retractable support legs 524a-524n may drop down, telescope down, crank down, and/or the like when desired and provide support for transportable shelter 100. In embodiments, one or more of retractable legs 524a-524n may automatically drop down as a segment (e.g., 401n) is being pulled out of another segment (e.g., 101a). In reverse, one or more of retractable legs 524a-524n may automatically fold up as a segment (e.g., 401n) is being pushed into another segment (e.g., 101a). One or more of retractable support legs 524a-524n may extend down independently from each other and/or include shocks, thereby accommodating an unleveled surface (e.g., ground) below. Any number of retractable support legs 524a-524n may extend downwards from segment 101a, and/or segment 401b, and/or segment 401n.

Retractable support legs 524a-524n may provide support for transportable shelter 100 while transportable shelter 100 is connected to vehicle 102 and in the expanded position. In such an example, a user may choose to utilize all or a subset of retractable support legs 524a-524n. For example, when transportable living space 100 is in an expanded position and attached to vehicle 102, a user may extend down some or all of distal (e.g., further from vehicle 102) retractable support legs 524a-524n while leaving proximal (e.g., nearer to vehicle 102) retractable support legs 524a-524n in their retracted position. Because vehicle 102 is supporting weight of the proximal portion of transportable shelter 100, a user could sleep in transportable shelter 100 while some or all of the proximal retractable support legs 524a-524n remain retracted. If desired, a user may extend downward some or all of the proximal retractable support legs 524a-524n while transportable shelter 100 is attached to vehicle 102.

Retractable support legs 524a-524n may provide support for transportable shelter 100 while transportable shelter 100 is disconnected from vehicle 102. In the extended position, a user may extend down all or a subset of retractable support legs 524a-524n and disconnect transportable shelter 100 from vehicle 102. In this position, retractable support legs 524a-524n may provide support for transportable shelter 100, and a user may be inside transportable shelter 100 with or without vehicle 102's presence. In embodiments, some or all of retractable support legs 524a-524n may include small wheels (not shown), for example caster wheels and/or the like. In an example, a user could push (e.g., glide) transportable shelter 100 around a location in its expanded position without vehicle 102.

Figure 6:
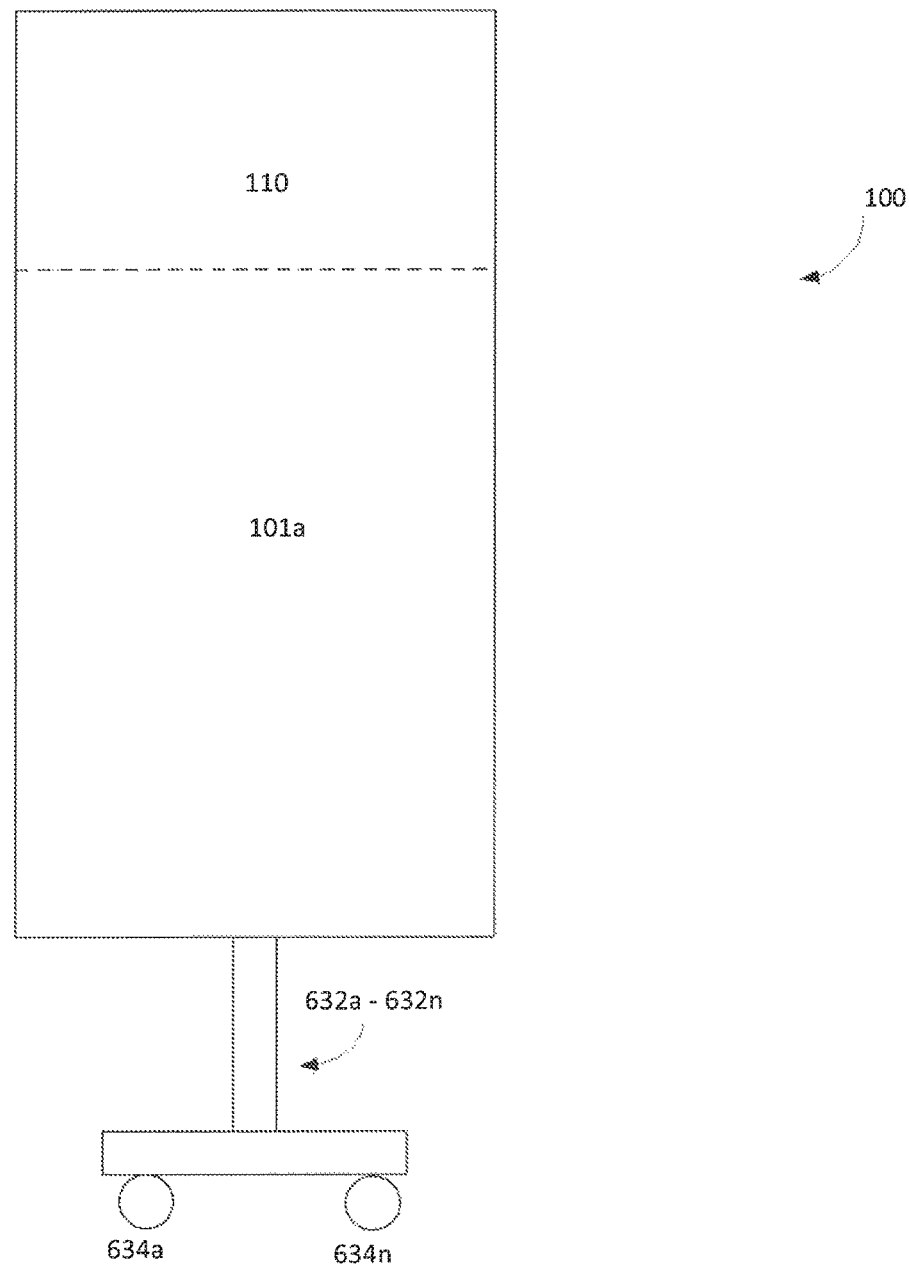
FIG. 6 is a block diagram illustrating details of a transportable shelter according to some embodiments.

FIG. 6 illustrates an example wherein some or all support legs are extended while transportable shelter 100 is in a retracted position. Extending downward a subset of support legs 524a-524n (e.g., one or more of support legs 632a-632n) while transportable shelter 100 is in a retracted position may provide support for transportable shelter 100 while transportable shelter 100 is being stored. For example, a user could back transportable shelter 100 into a garage, extend down support legs 632a-632n, disconnect transportable shelter 100 from vehicle 102, and store transportable shelter 100 in a small segment of the garage, leaving abundant space in the garage for other storage (e.g., vehicle 102 storage). In embodiments, support legs 632a-632n may include wheels 634a-634n (e.g., caster wheels and/or the like). In an example, while transportable shelter 100 is in a retracted position, a user may extend down support legs 632a-632n, disconnect transportable shelter 100 from vehicle 102, and push (e.g., glide) transportable shelter 100 into a storage location using wheels 634a-634n. Wheels 634a-634n may include locks such that the wheels are prevented from rolling while in the locked position or otherwise cause retractable support legs 524a-524n to be stationary (e.g., wheel lifts, wheel wedges, and/or the like). Locking the wheels may provide safety while a user is inside transportable shelter 100 and/or while transportable shelter 100 is in its retracted position.

In embodiments, transportable shelter 100 may comprise electronics including, but not limited to, one or more computers, processors, controllers, integrated circuit boards, memories, non-transitory computer executed programming stored on a memory, inputs, outputs, receivers, transceivers, wireless communications, and the like. For instance, some or all of the steps of expanding transportable shelter 100, retracting transportable shelter 100, expanding support legs 524a-524n, and or retracting support legs 524a-524n may be controlled electronically. In embodiments, a user may press a button (or otherwise give an indication) on an input device (e.g., control panel, smart phone, smart tablet, and the like) indicating the user's desire that transportable shelter 100 transition into an expended position. In response to receiving the input, a controller of transportable shelter 100 may automatically expand transportable shelter 100 in one or more manner as is described herein.

In embodiments, a user may press a button (or otherwise give an indication) on an input device indicating the user's desire that transportable shelter 100 transition into a retracted position. In response to receiving the input, a controller of transportable shelter 100 may automatically retract transportable shelter 100 in one or more manner as is described herein. Further, transportable shelter 100 may receive one or more input from a user indicting a desire that one or more support leg 524a-524n be expanded and/or retracted to any desired length. Further still, transportable shelter 100 may receive one or more input from a user indicating a desired air conditioner setting. one or more computers, processors, controllers, integrated circuit boards, memories, non-transitory computer executed programming stored on a memory, inputs, outputs, receivers, transceivers, wireless communications, and the like may be powered by a battery of transportable shelter 100, by vehicle 102 via the trailer light wires, and/or via an external power source that transportable shelter 100 plugs into (e.g., an electrical socket).

Methods of using transportable shelter 100 include but are not limited to, expanding transportable shelter 100, retracting transportable shelter 100, hauling transportable shelter 100, storing transportable shelter 100, and more. In embodiments, a user may want to transition transportable shelter 100 from a retracted position to an expanded position. In embodiments, a user may extend one or more of retractable support legs 524a-524n. Further, the user may decouple insert bar 104 from the vehicle's trailer hitch receiver 103. In examples, one or more of the retractable support legs 524a-524n may include wheels (e.g., caster wheels). If so, the use may push transportable shelter 100 around on the ground when transportable shelter 100 is decoupled from vehicle 102. Because the retractable support legs are supporting the weight of transportable shelter 100, transportable shelter 100 may be pushed around a space relatively easily.

In embodiments, a user may expand transportable shelter's 100 housing by pulling the housing's segments out of one another. For example, a user may pull a second segment out of a first segment. Further, if transportable shelter 100 includes one or more additional segments, the user may pull an $n^{th}$ segment out of the first segment and pull the second segment out of the $n^{th}$ segment. Transportable shelter 100 may have any number of segments, and a user may select a desirable size of transportable shelter 100 by pulling out only as many segments as is desired at that time.

With some or all of the segments pulled out, in example embodiments, the user may expand a retractable floor 212 that is located inside the interior of the housing. For instance, a user may open the door, craw into the housing, and pull (e.g., unfold, unroll, stretch, and the like) the retractable floor 212 into its expanded position. Additionally or alternatively, retractable floor 212 may automatically expand into its expanded position as the various segments are being pulled out of one another.

In embodiments, transportable shelter 100 may include one or more mattress (e.g., air mattress). In embodiments, the one or more mattress (e.g., twin mattress, full mattress, queen mattress, and the like) may be an air mattress, which is inflated and rests on retractable floor 212. The one or more air mattress may be include one or more air compressor that is housed within transportable shelter 100 and electrically connected to transportable shelter 100. In embodiments, a control panel of transportable shelter 100 receives input from a user indicating that one or more of the air mattresses is to be inflated. Upon receiving input, a controller of transportable shelter 100 initiates one or more air compressor and the identified mattresses are inflated. In embodiments, one or more air compressor may automatically begin inflating upon sensing that transportable shelter 100 has been expanded, wherein one or more air mattress is inflated without receiving input from a user. In embodiments, one or more air mattress may be separate from transportable shelter 100 and placed within transportable shelter 100 by the user, wherein the user connects an air compressor and inflated the one or more air mattress himself.

In example embodiments, one or more user may desire to enter transportable shelter 100. A user may open door 530 and enter the interior of transportable shelter 100, wherein transportable shelter 100 provides shelter for the user from external elements (e.g., sun, heat, rain, wind, strangers, bugs, and/or the like). A user may transition one or more window and/or vent between an open position and a closed position. A user may adjust air conditioner and/or fan settings as is desired. A user may lock door 530 and/or some or all windows and/or vents. A user may transition one or more shade located on or near a window and/or vent in order to block exterior light. Transportable shelter 100 may be equipped with internal lighting.

In embodiments, a user may want to transition transportable shelter 100 from an expanded position to a retracted position. In embodiments, a user may deflate the one or more air mattresses. In embodiments, deflated mattresses be removed from transportable shelter 100 before retracting the housing of transportable shelter 100. In embodiments, deflated mattresses may be stored inside the interior of transportable shelter 100 while the housing is retracted. In example embodiments, the one or more mattress may automatically deflate upon the user retracting transportable shelter 100 and/or indicating a desire that transportable shelter 100 be retracted.

In example embodiments, a user may push one or more segment into the other one or more segments, thereby causing the housing of transportable shelter 100 to telescope into itself. A user may push the segments manually and/or a controller may electronically draw the segments into each other. In embodiment, while transportable shelter 100 is telescoping closed, support legs 524a-524n may automatically retract into the housing. In embodiments, some or all of support legs 524a-524n may be mounted to their respective segment such that when a segment is pushed (or drawn) into its preceding segment, the force on the support legs against the preceding segment push the support legs up into its respective segment's base. In embodiments, some or all of support legs 524a-524n are folded into, drawn into, cranked into, and or otherwise retracted into its respective segment, before, during, and/or after the housing of transportable shelter 100 is fulling telescoped into itself.

In embodiments, storage shelf 214 remains within transportable shelter 100 while transportable shelter 100 is in its retracted position. In embodiments, items resting and or attached to storage shelf 214 remain within transportable shelter 100 while transportable shelter 100 is in its retracted position. In embodiments, an air conditioned resting on and/or attached to storage shelf 214 remains within transportable shelter 100 while transportable shelter 100 is in its retracted position.

In embodiments, retractable floor 212 is in a retracted position and stored within transportable shelter 100 while transportable shelter 100 is in its retracted position. In embodiments, a user may manually retract retractable floor 212 prior to retracting transportable shelter 100 into is in its retracted position. Additionally or alternative, retractable floor 212 may automatically retract, before and/or while transportable shelter 100 is retracting into its retracted position. Automated retraction and/or expansion of retractable floor 212 may be mechanical and/or electrical (e.g., computer automated).

In embodiments, while transportable shelter 100 is in its retracted position, a user may choose to store transportable shelter 100. Transportable shelter 100 may be placed within a storage location and consume minimal space while therein (e.g., the housing may consume 12 square feet of space). In example storage methods, one or more support legs 524a-524n may be extended and supporting transportable shelter 100. Transportable shelter 100 may be stored with one or more of support legs extended. In embodiments, support legs may include one or more wheels 634a-634n. In example storage methods, transportable shelter 100 may be pushed around by a person via wheels 634a-634n within a storage location. If desired, retractable support legs 524a-524n may be retracted while transportable shelter 100 is being stored. Retracting all the supporting legs may cause transportable shelter 100 to fit within a smaller storage location.

In embodiments, while transportable shelter 100 is in its retracted position, a user may choose to transport transportable shelter 100. A user may choose to slide insert 104 into trailer hitch receiver 103 of vehicle 102. A user may use a pin, latch, snap, lock, or other coupling mechanism to secure insert 104 within trailer hitch receiver 103. In embodiment, while transportable shelter is attached to vehicle 102, a user may choose to retract all of support legs 524a-524n. When all the support legs 524a-524n are raised, transportable shelter 100 is fully supported by vehicle 102. As least in this position, no wheels support transportable shelter 100. The vehicle may be made to move (e.g., forward, backwards, side to side, and the like) and haul transportable shelter 100 there-behind without any tow wheels. If desired, a user may connect trailer taillight wires to transportable shelter 100, thereby providing power for directional lighting, stop lighting, interior lighting, air conditioning, fans, controllers, processors, and/or any electrical component of transportable shelter 100.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A transportable shelter, which provides shelter from exterior elements comprising:
   a telescoping housing comprising a plurality of segments, wherein while in an expanded position, the telescoping housing accommodates at least one person therein;
   a first segment of the plurality of segments;
   a storage shelf inside an interior of the first segment;
   a second segment of the plurality of segments, wherein while in a retracted position, the second segment slides into the first segment; and
   an insert bar that is receivable into a trailer hitch receiver of a vehicle, wherein while in the retracted position, the transportable shelter is hauled without towing wheels by the vehicle.

2. The transportable shelter of claim 1 further comprising: at least one support leg coupled to the first segment comprising caster wheels that transport the transportable shelter while not coupled to the vehicle.

3. The transportable shelter of claim 1 wherein the first segment comprises:
a first driver's-side side section;
a first passenger's-side side section;
a first roof section; and
a first front section, and wherein
the second segment comprises:
a second driver's-side side section;
a second passenger's-side side section;
a second roof section; and
a second back section.

4. The transportable shelter of claim 1 further comprising:
a door through which the person enters.

5. The transportable shelter of claim 1 further comprising:
a seal between the first segment and the second segment.

6. The transportable shelter of claim 1 wherein while the transportable shelter is in the retracted position, the telescoping housing is storable within twelve square feet.

7. The transportable shelter of claim 1 wherein the storage shelf is removable.

8. The transportable shelter of claim 1 wherein while in the retracted position, the storage shelf is located within the interior of the first segment.

9. The transportable shelter of claim 1 wherein while in the retracted position, an item resting on the storage shelf remains on the storage shelf.

10. The transportable shelter of claim 1 further comprising:
a third segment of the plurality of segments,
wherein while in the expanded position, the third segment is between the first segment and the second segment, and
wherein while in the retracted position, the second segment slides into the third segment and the third segment slides into the first segment.

11. The transportable shelter of claim 1 further comprising:
tail lights.

12. The transportable shelter of claim 1 further comprising:
a source of power in the interior of the transportable shelter.

13. The transportable shelter of claim 1 further comprising:
a powered vent fan.

14. The transportable shelter of claim 1 further comprising:
a retractable floor.

15. The transportable shelter of claim 14 wherein the retractable floor automatically expands as the transportable shelter expands and automatically retracts as the transportable shelter retracts.

16. The transportable shelter of claim 1 wherein an air conditioner is stored on the storage shelf.

17. The transportable shelter of claim 16 wherein the first segment comprises:
at least one window or vent located adjacent the air conditioner, wherein the at least one window or vent ventilates the air conditioner.

18. The transportable shelter of claim 1 wherein second segment comprises:
at least one support leg that automatically transitions from the retracted position to the expanded position as the second segment slides out from the first segment.

19. The transportable shelter of claim 18 wherein the at least one support leg further comprises:
caster wheels that transport the transportable shelter while not coupled to the vehicle.

20. A method of retracting a transportable shelter, which provides shelter to at least one person from exterior elements, comprising:
providing a telescoping housing comprising a plurality of segments including at least a first segment and a second segment;
maintaining a storage shelf that is mounted inside an interior of the first segment;
sliding the second segment into the first segment, while transitioning the telescoping housing from an expanded position to a retracted position;
inserting an insert bar of the transportable shelter into a trailer hitch receiver of a vehicle; and
wherein while in a retracted position, the transportable shelter is hauled without towing wheels by the vehicle.

21. The method of claim 20 further comprising:
sliding a third segment into the first segment; and
sliding the second segment into the third segment.

22. The method of claim 20 further comprising:
automatically retracting one or more support legs up into the second segment as a user performs the sliding of the the second segment into the first segment.

23. The method of claim 20 further comprising:
powering tail lights.

24. The method of claim 20 further comprising:
providing a source of power in the interior of the transportable shelter.

25. The method of claim 20 further comprising:
powering a vent fan.

26. The method of claim 20 further comprising:
retracting a retractable floor inside the transportable shelter.

27. The method of claim 20, wherein the sliding the second segment into the first segment comprises:
automatically retracting a retractable floor.

* * * * *